April 19, 1955  G. C. REISER  2,706,626
COTTON BALE SCALE
Filed July 20, 1953  3 Sheets-Sheet 1
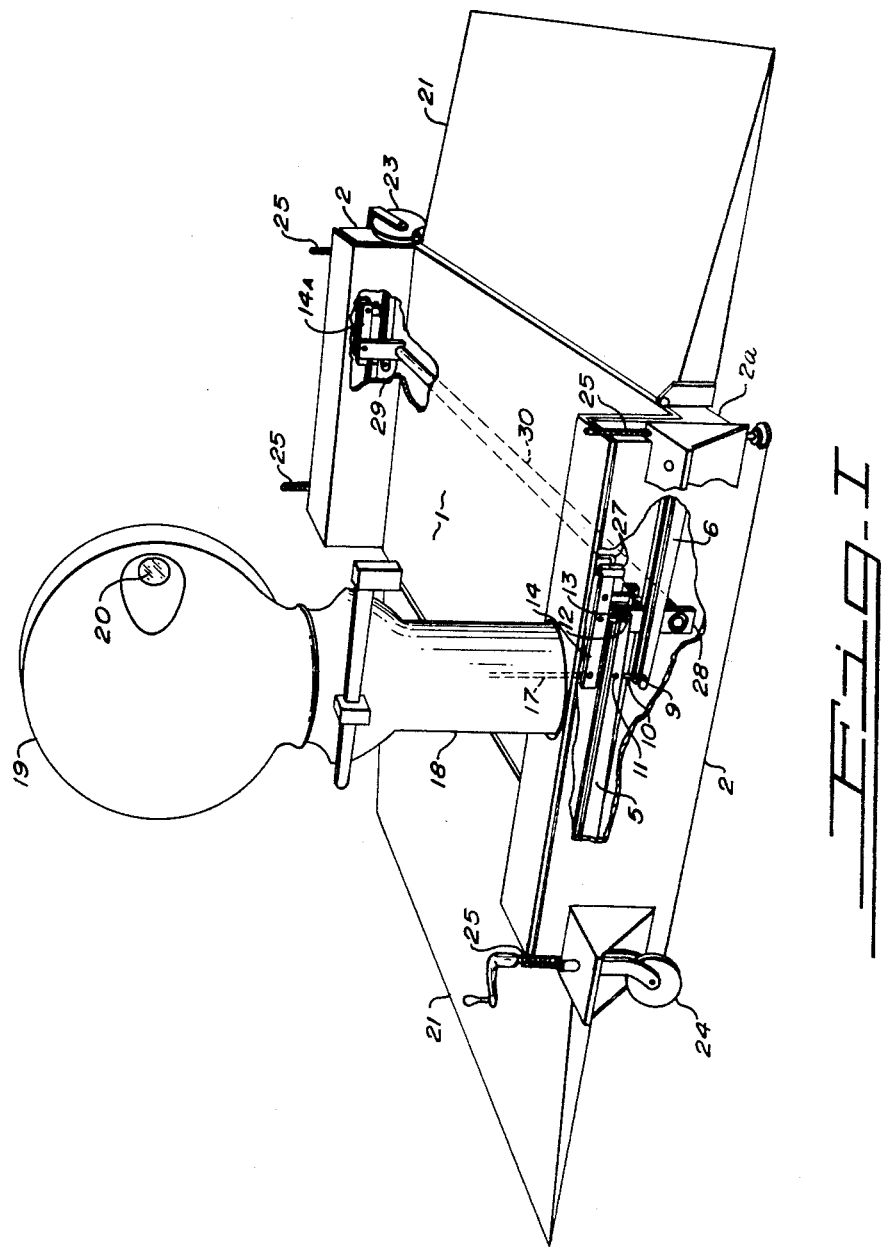
INVENTOR.
GEORGE C. REISER
BY
Marshall, Marshall and Grasting
ATTORNEYS

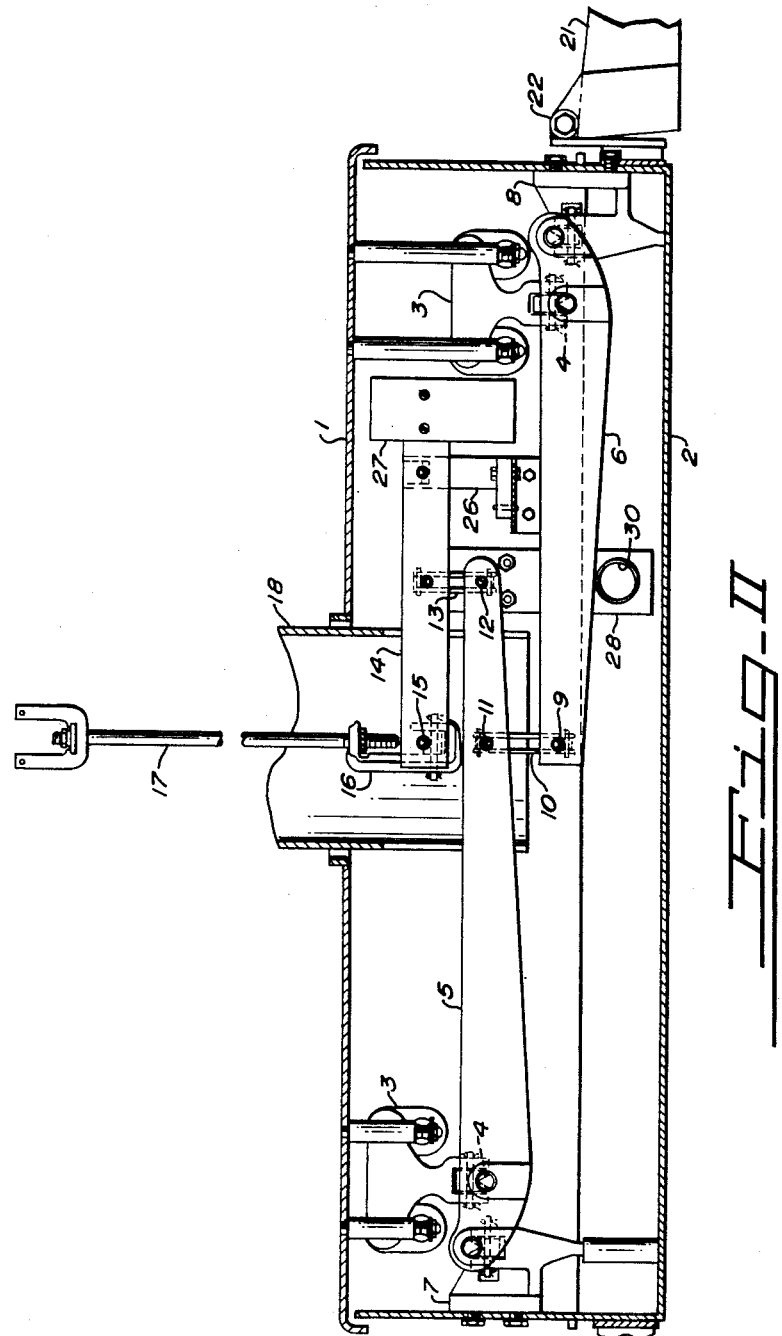

April 19, 1955  G. C. REISER  2,706,626
COTTON BALE SCALE
Filed July 20, 1953  3 Sheets-Sheet 3
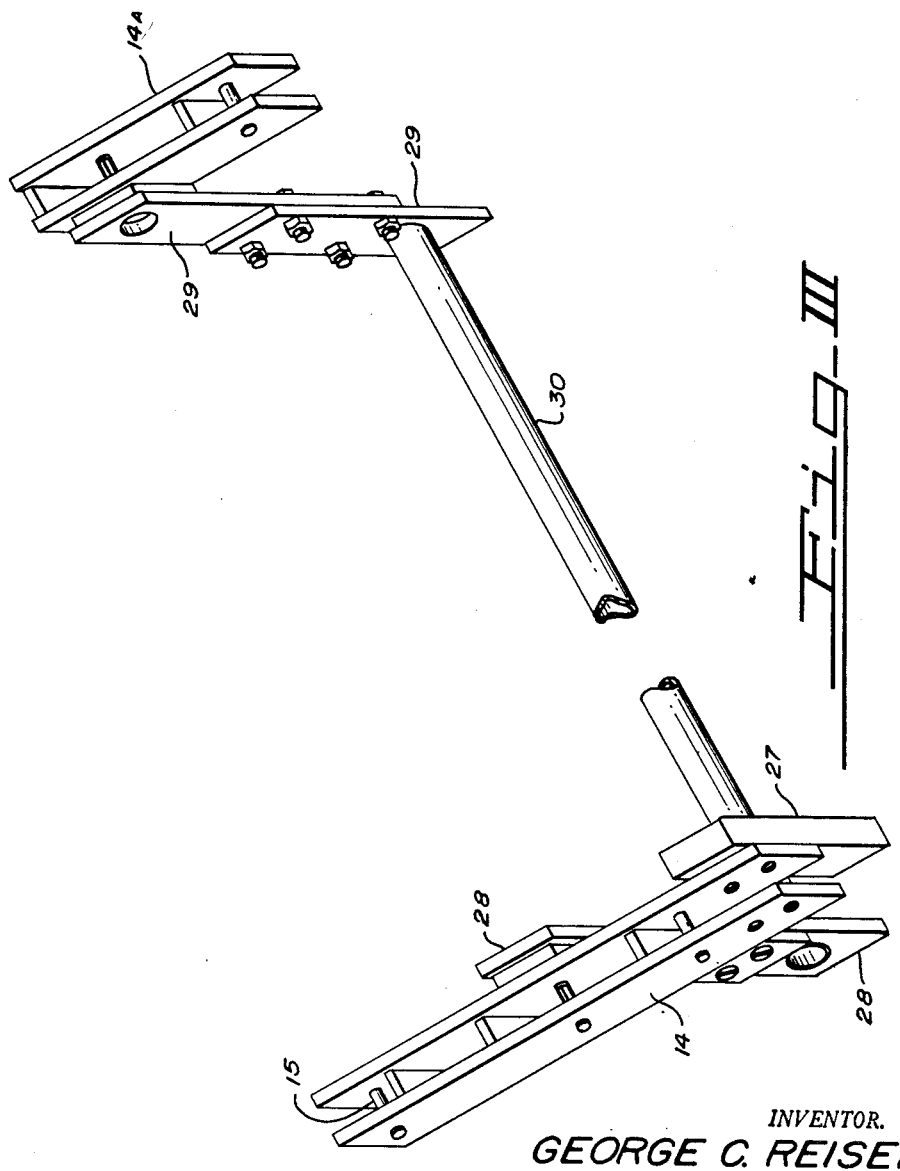
Fig. III
INVENTOR.
GEORGE C. REISER
BY
Marshall, Marshall and Yeasting
ATTORNEYS

United States Patent Office 2,706,626
Patented Apr. 19, 1955

2,706,626

COTTON BALE SCALE

George C. Reiser, Toledo, Ohio, assignor to Toledo Scale Company, Toledo, Ohio, a corporation of New Jersey Application July 20, 1953, Serial No. 368,893

6 Claims. (Cl. 265—55)

This invention relates to weighing scales and in particular to an improved lever system permitting the use in a portable scale of an extremely low load receiver.

In certain industries particularly in the handling of baled cotton in the warehouses there is a need for a medium capacity portable scale having a platform or load receiver low enough to the floor so that hand trucks loaded with produce may be wheeled onto the scale. The problem in such a scale is to construct the lever system so that it is both accurate and strong enough and also that it does not interfere with the low platform. It has been customary to make the platforms of such scales of a generally trough-shaped arrangement with lever systems arranged along each side of the trough and below overhanging portions thereof to support such load receivers.

The principal object of this invention is to provide an improved lever system for supporting the load receiver of a portable, medium capacity weighing scale.

Another object of the invention is to provide a lever system arrangement such that the over-all height of the load receiver need be no greater than that required for the frame-work interconnecting the lever housings at each side of the load receiver.

A still further object of the invention is to provide an improved lever system wherein intermediate levers located above the main levers supporting the load receiver are interconnected by a generally U-shaped torsion member passing beneath the load receiver.

More specific objects and advantages are apparent from the following description of an improved form of the invention.

According to the invention a U-shaped load receiver is supported upon lever systems arranged along the sides of the load receiver and interconnected by a torsion member extending crosswise beneath the load receiver. A load counter-balancing and indicating mechanism is mounted on a lever housing along one side of the load receiver and above the lever system at that side so as to counterbalance and indicate the load on the load receiver.

A preferred form of the invention is illustrated in the accompanying drawings.

In the drawings:

Figure I is a perspective view, with parts broken away, showing the general arrangement of the improved lever system as incorporated in a portable weighing scale.

Figure II is an end elevation, with parts broken away, showing the lever system at the load counterbalancing side of the improved weighing scale.

Figure III is a perspective view of the interconnecting torsion member and the intermediate levers connected thereby.

These specific figures and the accompanying description are intended merely to illustrate the invention but not to limit its scope.

Referring to Figure I, the improved weighing scale includes a generally U-shaped or trough-shaped load receiver 1 having raised portions extending horizontally over a pair of lever housings 2 extending one along each side of the load receiver 1. The pair of lever housings 2 and a low framework 2a interconnecting the parallelly arranged lever housings form a frame for the weighing scale.

According to conventional scale practice each extremity of the load receiver 1, in this case the raised portions extending over the lever housings 2, is supported on parallel link suspensions 3 (see Figure II) that rest on load pivots 4 of main levers 5 and 6. The main levers 5 and 6 are fulcrumed on fulcrum stands 7 and 8 mounted at the ends of the lever housings 2. A load pivot 9 of the main lever 6 is connected through a link 10 to a pivot 11 of the other main lever 5 so as to transmit force thereto. A power pivot 12 of the main lever 5 is connected through a bearing and link arrangement 13 to an intermediate lever 14 which in turn has its power pivot 15 connected through stirrup and bearing 16 to a steelyard rod 17 extending upwardly through a column 18 erected on the lever housing 2.

Automatic load counterbalancing and indicating mechanism is enclosed within a generally watchcase-shaped housing 19 surmounting the column 18 which housing has a viewing window 20 equipped with a magnifying glass for displaying magnified images of weight indicia carried on a rotatable chart of the load counterbalancing mechanism. The chart, as is common practice, is rotated through equal increments of angle for equal increments of load on the load receiver 1. Referring again to Figure I, a pair of ramps 21 are provided, one at each end of the load receiver 1, the ramps 21 being hinged to the framework 2a of the scale so that they may be folded over the load receiver 1 when the scale is to be transported from one place to another. For this reason they are attached with hinges 22 (see Figure II). Since one of the objects of this type of scale is to facilitate loading and unloading relatively heavy loads, the ramps are made as low as possible to provide a gentle incline leading from the floor to the load receiver.

In order that the scale may be moved from place to place it is provided with wheels 23 fixed to one of the lever housings 2 and caster wheels 24 fixed to the other of the lever housings 2. The caster wheels, one of which is shown in Figure I, are attached to that one of the lever housings supporting the column 18 and the load counterbalancing mechanism.

To take care of uneven floors where the scale may be used, it is further provided with leveling jacks 25 one at each corner of the scale which permit it to be leveled in whatever location it is to be used.

Referring again to Figures I and II and in particular Figure II, it should be noted that the column 18 supporting the load counterbalancing mechanism is mounted from the lever housing 2 rather than from the load receiver 1. However the load receiver 1 does extend over the lever housings so that there is no danger of inaccurate weights because of interference between loads on the load receiver and the otherwise exposed lever housings.

Referring to Figure II and in particular to the intermediate lever 14, it should be noted that this lever is fulcrumed on a fulcrum stand 26 erected from a bracket extending between the sides of the lever housing 2. In this position the intermediate lever 14 is located above the level of the main levers 5 and 6 so that the connections are all by means of links which tend to be self-stabilizing. Furthermore the intermediate lever 14 is provided with a counterweight 27 of such mass as to partially offset the weight of the levers 5 and 6. The intermediate lever 14 has a downwardly directed arm 28 the lower end of which is just above the floor of the lever housing 2. An intermediate lever 14a at the other side of the load receiver corresponding to the intermediate lever 14 has a similar downwardly directed arm 29 and the lower ends of these downwardly directed arms are joined rigidly with a torsion shaft 30 formed from a pipe. The arms 28 and 29 along with the torsion shaft 30 provide a U-shaped torsion member for interconnecting the lever systems. This particular arrangement wherein the arms 28 and 29 extend upwardly from the shaft 30 to the intermediate levers 14 and 14a mounted in the upper portion of the lever housings permits the interconnection of the two lever systems at points where the forces are a minimum so that little deflection between the two lever systems occurs. Thus the scale is accurate regardless of the location of the load on the load receiver.

The U-shaped torsion member assembly is shown in detail in the perspective view, Figure III. As shown therein, the intermediate levers 14 and 14a are shown with the arms 28 and 29 attached to their sides but offset from the vertical plane through the pivots. This offsetting of the arms 28 and 29 to the sides of the intermediate levers 14 and 14a allows the main levers of the lever systems to occupy their natural positions immediately below the intermediate lever without causing any interference with the arms 28 and 29. Likewise, as may be seen in Figure I, the counterweights 27 are divided one part on each side of the lever 14 so as not to interfere with the lever or with the fulcrum stand.

This improved arrangement of the levers in the lever systems for a low platform height portable scale takes advantage of the parallel link suspensions 3 which are found to be commercially necessary for any scale of this type and also takes advantage of the link connections between the various levers so that the lever systems are more or less self-stabilizing. Likewise the extremely low position of the torsion shaft 30 interconnecting the lower ends of the downwardly extending arms 28 and 29 permits the load receiver to be located as low as is possible. In fact the limiting factor for the height of the load receiver is the framework 2a interconnecting the lever housings 2 rather than the U-shaped torsion member assembly.

Various modifications may be made in specific details of construction without departing from the spirit and scope of the invention.

Having described the invention I claim:

1. In a portable weighing scale, in combination, a pair of parallelly arranged lever housings connected by a low framework, a trough-shaped load receiver located between said housings with portions overlying said housings, a lever system in each housing for supporting the load receiver, each of said systems comprising a pair of main levers and an intermediate lever with the intermediate lever located above a main lever and link connected thereto, load counterbalancing and indicating mechanism operatively connected to one of said intermediate levers, and a U-shaped torsion member interconnecting said intermediate levers and passing beneath said load receiver.

2. In a portable weighing scale, in combination, a frame, a trough-shaped load receiver, a first and a second lever at each side of said load receiver for supporting said load receiver from the frame, means operatively connecting each first lever to the adjacent second lever, a pair of third levers fulcrumed on said frame and operatively connected one to each set of first and second levers, said third levers being situated above said cooperating first and second levers, a U-shaped member strong in torsion interconnecting said third levers with the bottom of the U passing beneath and transverse to the trough-shaped load receiver, and weighing mechanism mounted from said frame at one side of the load receiver, said weighing mechanism being operatively connected to the third lever at that side of the trough-shaped load receiver.

3. The device according to claim 2 in which the portion of the U-shaped member passing beneath the load receiver comprises a pipe.

4. In a portable weighing scale, in combination, a frame, a substantially rectangular trough-shaped load receiver, a first and a second lever at each outer side of said load receiver for pivotally supporting the load receiver near its corners from the frame, a tension link connecting each first and second lever, a third lever above each first and second lever, each third lever being fulcrumed on the frame, a tension link connecting each third lever to the other levers at that side of the load receiver, a U-shaped member strong in torsion interconnecting said third levers with the bottom side of the U passing beneath and transverse to the trough-shaped load receiver, and weighing mechanism surmounting said frame at one side of the load receiver, said weighing mechanism being operatively connected to the third lever at that side of the load receiver.

5. In a portable weighing scale having a load receiver the top of which is of a minimum height above a floor on which the scale rests, in combination, a frame, a pair of levers at two opposite sides of the load receiver for supporting said load receiver on said frame, a third lever above each pair of levers and operatively connected to the adjacent pair of said levers, each of said third levers being fulcrumed on the frame, a member strong in torsion passing beneath said load receiver and interconnecting said third levers, and weighing mechanism mounted from said frame and operatively connected to one of said third levers.

6. In portable weighing scale having a load receiver the top of which is of a minimum height above a floor on which the scale rests, a frame above which the load receiver is supported, at least one inclined ramp leading from the floor to the level of the ramp to facilitate moving an article to be weighed from the level of the floor to said load receiver, a pair of levers at two opposite sides of the load receiver, said levers being fulcrumed on said frame and supporting said load receiver, a third lever above each pair of levers and operatively connected thereto, each of said third levers being fulcrumed on the frame, a U-shaped member strong in torsion having the bottom of the U passing beneath said load receiver, said U-shaped member interconnecting said third levers, and weighing mechanism mounted from said frame and operatively connected to the third levers.

References Cited in the file of this patent

UNITED STATES PATENTS

| 704,946 | Sohn | July 15, 1902 |

FOREIGN PATENTS

| 429,986 | Great Britain | June 11, 1935 |

OTHER REFERENCES

"Industrial Weighing," by John Considine, published 1948 by Reinhold Publishing Corp., 330 W. 42nd Street, N. Y. C.